(12) United States Patent
Vonolfen et al.

(10) Patent No.: US 10,313,607 B2
(45) Date of Patent: *Jun. 4, 2019

(54) METHOD FOR DIFFERENTIATING BETWEEN BACKGROUND AND FOREGROUND OF SCENERY AND ALSO METHOD FOR REPLACING A BACKGROUND IN IMAGES OF A SCENERY

(71) Applicant: Fraunhofer-Gesellschaft Zur Foerderung Der Angewandten Forschung E.V., Munich (DE)

(72) Inventors: Wolfgang Vonolfen, Bonn (DE); Rainer Wollsiefen, Bonn (DE)

(73) Assignee: Fraunhofer-Gesellschaft-Zur Foerderung Der Angewandten Forschung E.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,783

(22) Filed: May 12, 2016

(65) Prior Publication Data

US 2016/0255283 A1     Sep. 1, 2016

Related U.S. Application Data

(60) Division of application No. 13/796,305, filed on Mar. 12, 2013, now Pat. No. 9,355,325, which is a
(Continued)

(30) Foreign Application Priority Data

Sep. 20, 2010   (DE) .................... 10 2010 046 025

(51) Int. Cl.
*H04N 9/75*   (2006.01)
*H04N 5/272*   (2006.01)
(Continued)

(52) U.S. Cl.
CPC ............... *H04N 5/272* (2013.01); *G06K 9/34* (2013.01); *H04N 5/2224* (2013.01); *H04N 5/3696* (2013.01); *H04N 9/75* (2013.01)

(58) Field of Classification Search
CPC ........ H04N 5/272; H04N 9/75; H04N 5/2224; G06K 9/34
See application file for complete search history.

(56) References Cited

U.S. PATENT DOCUMENTS 5,897,413 A * 4/1999 Erland .................. G03B 15/08
                                                           348/E5.022
5,986,718 A * 11/1999 Barwacz ................. H04N 9/75
                                                           345/634
(Continued)

FOREIGN PATENT DOCUMENTS

CA         2386250 A1    1/2001
DE   10 2010 046025.7    1/2001
(Continued)

OTHER PUBLICATIONS

Office Action issued by the New Zealand Patent Office dated Oct. 14, 2016 in New Zealand Application No. 724280.
(Continued)

*Primary Examiner* — Shaghayegh Azima
(74) *Attorney, Agent, or Firm* — Gesmer Updegrove LLP

(57) ABSTRACT

The present invention relates to a method for differentiating between background and foreground in images or films of scenery recorded by an electronic camera. The invention relates in addition to a method for replacing the background in recorded images or films of scenery while maintaining the foreground.

5 Claims, 8 Drawing Sheets

Figure 1:
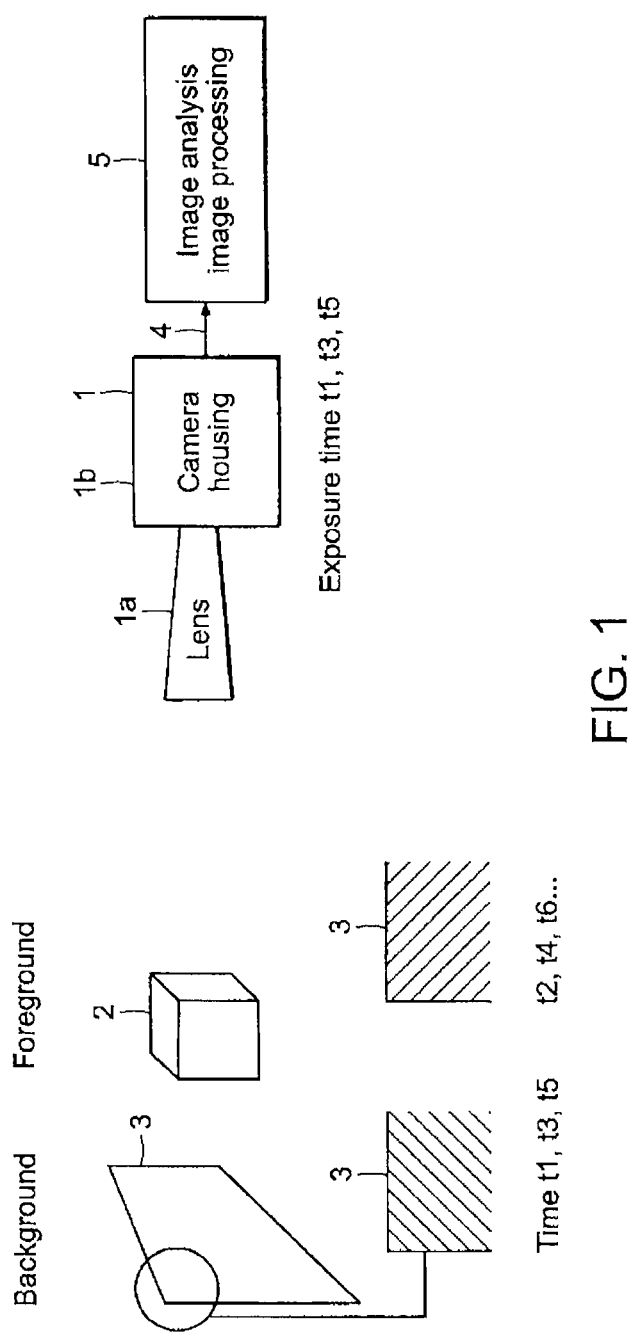

Related U.S. Application Data continuation of application No. PCT/EP2011/004114, filed on Aug. 16, 2011.

(51) Int. Cl.
| | |
|---|---|
| H04N 5/222 | (2006.01) |
| G06K 9/34 | (2006.01) |
| H04N 5/369 | (2011.01) |

(56) References Cited

U.S. PATENT DOCUMENTS

| | | | | |
|---|---|---|---|---|
| 6,342,887 | B1 * | 1/2002 | Munroe | G06T 15/50 |
| | | | | 345/419 |
| 6,490,006 | B1 * | 12/2002 | Monjo | H04N 5/272 |
| | | | | 348/587 |
| 6,532,022 | B1 * | 3/2003 | Ahmad | G06T 5/008 |
| | | | | 345/629 |
| 7,313,254 | B2 * | 12/2007 | Lee | G06T 7/12 |
| | | | | 382/103 |
| 8,045,060 | B2 * | 10/2011 | Cole | H04N 9/75 |
| | | | | 348/587 |
| 9,355,325 | B2 | 5/2016 | Vonolfen et al. | |
| 2002/0037103 | A1 * | 3/2002 | Hong | G06T 7/11 |
| | | | | 382/173 |
| 2002/0126396 | A1 * | 9/2002 | Dolgoff | G02B 27/2278 |
| | | | | 359/743 |
| 2005/0212925 | A1 * | 9/2005 | Lefebure | G06T 3/00 |
| | | | | 348/222.1 |
| 2007/0247553 | A1 * | 10/2007 | Matusik | H04N 5/272 |
| | | | | 348/595 |
| 2008/0084508 | A1 * | 4/2008 | Cole | H04N 5/275 |
| | | | | 348/744 |
| 2008/0168512 | A1 * | 7/2008 | Nguyen | H04N 7/165 |
| | | | | 725/105 |
| 2009/0100338 | A1 * | 4/2009 | Saetti | A63F 13/00 |
| | | | | 715/716 |
| 2011/0102628 | A1 * | 5/2011 | Ciuc | G06T 7/11 |
| | | | | 348/222.1 |
| 2011/0164677 | A1 * | 7/2011 | Lu | H04N 19/176 |
| | | | | 375/240.02 |

FOREIGN PATENT DOCUMENTS

| | | | |
|---|---|---|---|
| DE | 10200704719 A1 * | 3/2008 | |
| DE | 102007041719 | 5/2008 | |
| DE | 102007041719 A1 | 5/2008 | |
| EP | 1499117 A1 | 1/2005 | |
| JP | S4922035 | 2/1974 | |
| JP | 04083480 A | 3/1992 | |
| JP | H1051803 A | 2/1998 | |
| JP | H11353703 | 12/1999 | |
| JP | 2000069498 A | 3/2000 | |
| JP | 2005504457 | 11/2002 | |
| JP | 201014639 | 1/2010 | |
| NZ | 609152 | 9/2015 | |
| NZ | 705445 | 5/2016 | |
| NZ | 705446 | 10/2016 | |
| WO | 0106766 | 1/2001 | |
| WO | 0106766 A1 | 1/2001 | |
| WO | PCT/EP2011/004114 | 8/2011 | |

OTHER PUBLICATIONS

International Preliminary Report on Patentability issued by the Patent Cooperation Treaty dated Mar. 26, 2013 in PCT Application No. PCT/EP2011/004114.
Office Action issued by the Ukrainian Patent Office dated Aug. 16, 2011 in Ukraine Application No. A 2013 03325.
European Communication dated Oct. 20, 2016 in European Application No. 11 746 179.8.
Office Action issued by the Japanese Patent Office filed on Jun. 29, 2015 in related Application No. 2016-040949.
Office Action issued by the Canadian Patent Office dated Jun. 12, 2017 in related Application No. 2,811,222.
Office Action issued by the Australian Patent Office dated Jun. 23, 2017 in related Application No. 2016202378.
Japanese Office Action dated Mar. 24, 2015 in connection with corresponding JP Application No. 2013-528536 and English translation of same.
First Examination Report dated Jan. 17, 2014 in connection with corresponding NZ Application No. 609152.
Russian Office Action Issued in Corresponding Patent Application No. 2013114194/07(020962) dated Jun. 25, 2015.
Israeli Office Action Issued in Corresponding Patent Application No. 225194 dated Jul. 19, 2015.
First Examination Report issued in New Zealand Application No. 705446 dated Mar. 19, 2015.
First Examination Report issued in New Zealand Application No. 705445 dated Mar. 19, 2015.
Australian Patent Office Examination Report dated Jun. 27, 2014 in connection with Australian Application No. 2011304767, 5 pages.
Ukrainian Office Action issued in connection with corresponding Ukrainian Application Serial No. 201303325 and English translation thereof dated Mar. 19, 2015.
Singaporean Office Action issued in connection with corresponding Singaporean Application Serial No. 201301950-0 dated Mar. 4, 2015.
Office Action issued by the Mexican Patent Office, dated Mar. 12, 2014 in connection with Mexican Application No. MX/a/2013/002984, 3 pages.
English translation of the International Preliminary Report on Patentability dated Apr. 4, 2013 in connection with International Application PCT/EP2011/004114, 20 pages.
Communication dated Aug. 4, 2014 in connection with corresponding SG Application No. 2013019500.
Filipino Patent Office Communication dated Sep. 3, 2014 in connection with Philippine Application No. 1/2013/500508, 2 pages.
Second Office Action issued by the Intellectual Property Office of the Philippines in connection with related Philippine Patent Application No. 1-2013-500508, 2 pages.
Search and Examination Report issued by the Intellectual Property Office in Singapore dated Mar. 3, 2015 in connection with related Singapore Patent Application No. 2013-01950-0, 11 pages.
Office Action issued by the Mexican Institute of Industrial Property dated Jul. 24, 2015 in connection with related Mexican Patent App. No. MX/a/2014/015412, 2 pages.
Office Action issued by the Mexican Institute of Industrial Property dated Jul. 24, 2015 in connection with related Mexican Patent App. No. MX/a/2014/015411, 2 pages.
International Search Report and Written Opinion issued in connection with PCT Application No. PCT/EP2011/004114, dated Mar. 1, 2012.
Graunhofer et al., "Dynamic Bluescreens" ACM Siggraph 2008, Talks on Siggrph 08, Jan. 1, 2008.
Office Action issued by the Chilean Patent Office in connection with related Chilean Patent Application No. 2013-00751 and English translation thereof, 9 pages.
Preliminary Rejection issued by the Korean Patent Office dated Mar. 26, 2018 in related Korean Patent Application No. 10-2018-7003087.
Second Office Action issued by the Canadian Patent Office dated Mar. 13, 2018 in related Canadian Patent Application No. 2,811,222.
Search and Examination Report issued by Korean Patent Office in related United Arabian Emirates Patent Application No. 284/2013.
Office Action issued by the Peruvian Patent Office dated Jul. 11, 2017 in related Application No. 000527-2013/DIN.
Office Action issued by the New Zealand Patent Office dated Jun. 15, 2016 in New Zealand Application No. 705446.
Office Action issued by the Argentinian Patent Office in Argentinian Application No. P110103422, dated Jun. 21, 2016.
Office Action issued by the Korean Patent Office dated Feb. 28, 2017 in related Application No. 10-2013-7009967.
Second Office Action issued by the Chilean Patent Office in connection with Chilean patent application No. 2013-00751 and partial English translation thereof, 8 pages.

(56) References Cited

OTHER PUBLICATIONS

First Office Action issued in related Qatar Patent Application No. QA/201303/00032.
Second Office Action issued in related Qatar Patent Application No. QA/201303/00032.
Office Action issued by the Peruvian Patent Office dated Nov. 3, 2017 in related Application No. 000527-2013/DIN.
Office Action issued by the New Zealand Patent Office dated Dec. 4, 2017 in related Application No. 724280.
Office Action issued by the Vietnamese Patent Office dated Nov. 27, 2017 in related Application No. 1-2013-01181.
Decision of Refusal issued by the Japanese Patent Office dated Apr. 3, 2018 in related Japanese Patent Application No. 2016-040949.
Preliminary Rejection issued by the Korean Patent Office dated Oct. 30, 2018 in related Korean Patent Application No. 10-2018-7003087.
Second Office Action issued by the Korean Patent Office dated Oct. 30, 2018 in related Korean Patent Application No. No. 10-2018-7003087.
Office Action issued by the Indian Patent Office dated Nov. 29, 2018 in related Application No. 2398/DELNP/2013.
Office Action issued by the Indonesian Patent Office dated Jan. 16, 2019 in related Indonesian Patent Application No. W00201301652.

\* cited by examiner

METHOD FOR DIFFERENTIATING BETWEEN BACKGROUND AND FOREGROUND OF SCENERY AND ALSO METHOD FOR REPLACING A BACKGROUND IN IMAGES OF A SCENERY

PRIORITY INFORMATION

The present application is a U.S. divisional application of U.S. continuation application Ser. No. 13/796,305 filed Mar. 12, 2013 which is a continuation of PCT application no. PCT/EP2011/004114, filed on Aug. 16, 2011, that claims priority to German application no. 102010046025.7, filed on Sep. 20, 2010.

The present invention relates to a method for differentiating between background and foreground in images or films of a scenery recorded by an electronic camera. The invention relates in addition to a method for replacing the background in recorded images of films of a scenery whilst maintaining the foreground.

In order to separate objects or persons recorded by a camera, who/which are standing one in front of the other in an actual scene and consequently mutually hide each other, various methods exist according to the state of the art. The most widely used method is hereby chroma-keying which has been used for a long time and in which the background in the actual scene has a definite colour which does not occur in the foreground objects. By means of simple colour analysis of the recorded image, this background can then be detected and separated from the foreground. It is disadvantageous with this method that the background in the actual scene must be present in a definite colour, which is not achievable in many situations.

It is the object of the present invention to indicate a method for differentiating between background and foreground in images or films of a scenery recorded by an electronic camera, which allows freedom in design of the background and of the foreground. In addition, it is the object to indicate a method for replacing a background in an image or film of a scenery, in which background and foreground can be designed freely.

This object is achieved by the method for differentiating between background and foreground in images of a scenery recorded by an electronic camera according to claim 1, the method for replacing a background in an image of a scenery according to claim 28 and the electronic display system according to claim 29. The dependent claims indicate advantageous developments of the methods according to the invention.

According to the invention, a method is provided, by means of which background and foreground can be differentiated from each other in images of a scenery recorded by an electronic camera. A part of the scenery which is remote from the camera is thereby regarded as background and the part of the scenery close to the camera as foreground. The scenery is the entirety of the objects of the background and of the foreground. If reference is made to images here, these can be fixed images or preferably frames of a film. Neither background nor foreground must thereby completely fill the image and can also appear only in parts or not at all in the image. The method according to the invention can also be used on partial regions of images. Thus for example in recordings of sporting events, pitch-perimeter advertising can be differentiated from players standing in front of it. In general, it is assumed that the foreground covers the background in regions from the perspective of the camera.

The method according to the invention can be implemented both in stationary images and in films of the scenery which are recorded with an electronic camera, i.e. for example a camera with a CCD- or CMOS image sensor. In principle, the method can also be implemented on the basis of image signals recorded by analogue electrical cameras, however implementation with digital cameras is preferred.

According to the invention, the background can display any image. This can be for example an image having a plurality of colours and/or a plurality of brightness stages. In particular, a monochrome and uniformly bright surface is preferably not understood as image in the sense of this document.

The image of the background is now shown with a coding which preserves the visibility of the image for a direct human observer of the scenery or even is completely invisible for such an observer of the scenery. The image with the coding being visible by a direct observer of the scenery means that this visibility is at least provided if the observer is directly observing the scenery in situ and is at a sufficient distance from the background, at which distance he is able however still to recognise the content of the image. The coding of the image therefore can comprise structuring of the image or of the background provided that this is so fine that an observer recognizes the image at a sufficient distance without the structuring thereby having a disturbing effect or being perceptible.

An image or film of the scenery with the background and the coding and also with a foreground situated in front of the background is now recorded by means of an electronic camera. An image sensor of the camera which records the images of the scenery thereby produces a signal. In this signal, the background is now differentiated from the foreground by means of the coding. It is thereby exploited that the background has the coding but the foreground does not.

Since the differentiation of the background from the foreground is undertaken in the signal of that image sensor which records the images or the film of the scenery for subsequent display or further processing or transmission, the method can be implemented with a camera having only one image sensor, namely the one recording the images, without a plurality of image sensors being required. Preferably, the method is therefore implemented with precisely one image sensor. According to the invention, also only the precisely one image signal of this one image sensor is therefore required.

In some embodiments, it can be necessary in order to recognise the background by means of the coding to modify suitably the image to be recorded by the camera or the image sensor. It is then preferred if the recorded image of the scenery is modified for storage, further processing or transmission such that the modification is undone just before recording of the image so that at least the foreground in the eventually produced image appears unadulterated, just as it would appear in a non-modified image.

In an advantageous embodiment of the invention, the coding of the image or of the background can comprise the background displaying periodically alternating different components of the image, the components of respectively one period composing the complete image. The period duration, i.e. the time within which all the components of the image are shown once, is thereby chosen to be so short that the complete image is visible for a direct observer of the scenery. An exposure time of the camera is now synchronised with the display of the components such that the camera always records only one component of the image which is chosen such that it allows a differentiation between the foreground and the background by means of a keying method, preferably by means of colour-based keying, such as e.g. chroma-keying. If m is the number of components into which the image is subdivided, then if the camera records precisely one component of each period, advantageously the frequency at which the components are changed when shown m– times the exposure frequency of the camera.

In the course of showing such components, at least one imaging parameter which influences the display of the image can be changed in the course of one period. There can be understood by an imaging parameter, for example a value or a group of values of weighting factors or scaling factors which are suitable for controlling the colour channels, the contrast, the brightness and/or the saturation of individual pixels, groups of pixels (patterns) or the complete image.

For the keying, the component of the background recorded during the exposure of the camera provides a mask which allows differentiation of the background from the foreground. Thus for example the exposed component can display a specific colour component of the image of the background amplified or exclusively, this colour, component being chosen preferably such that it is not present or only weakly in the foreground. In this case, the foreground can be differentiated from the background for example by means of colour-based keying, in particular chroma-keying.

According to the invention, any method which enables production of a mask by means of which the background can be differentiated from the foreground is intended to be understood as keying process in all embodiments of the invention. In general, "keying" describes a process for detecting components in an image or video. The components can thereby be recognised or filtered out (image analysis) and possibly replaced by other image sources (image composition). In the image analysis, specific features or codings in the image are detected and a mask which corresponds to the image components to be detected is generated therefrom. The mask can serve as template in the image composition. Calculation of the mask on the basis of the property or of the coding need not necessarily be complete and can be supplemented by further processes. There are included herein for example image analysis processes, such as optical flow, image segmentation according to colour, edges or the like or heuristics (i.e. assumptions about the objects in the scene). In particular, information can be derived from a camera tracking, with the help of which the viewing angle of the camera in the scene is known so that location and size of the background or even of the foreground in the image can be predetermined.

In general, there is therefore added to the background as coding a property which does not occur in the foreground or occurs only more weakly such that the background can be differentiated from the foreground in a mask based on this property.

In the above-described embodiment, the component used for exposure makes available the mask used for the keying. The other component or components of one period complete the image to form the complete image for a direct observer of the scenery. During the showing of these other components, the camera preferably does not record.

For example, the component shown during the exposure can display a specific colour component of the image amplified or reduced so that the foreground can be differentiated from the background by means of this colour component. The exposed component thereby shows this colour component increased when the foreground shows it reduced, or reduced when the foreground shows it increased.

The component or the other components which the background shows in one period can then show the complementary colour components correspondingly reduced or increased so that the direct observer of the scenery perceives the actual colours of the image.

In an advantageous embodiment of the invention, the image of the background can be divided into respectively exactly two components which are shown alternating with a specific frequency. The camera can then record synchronously with half the frequency of the exchange. Therefore always two components of the image are shown during one cycle of the camera. The frequency with which the shown component is changed is therefore here twice as high as the exposure frequency of the camera.

In another realization, given by way of example, of the above-described embodiment, the colours can be divided into three components and only one third exposed. The camera therefore exposes only one of the three components. In this case, the frequency with which the component is changed would be chosen to be three times as high as the exposure frequency of the camera.

A further embodiment of the method according to the invention provides that the coding of the image or of the background comprises the background displaying temporally alternating patterns which complement each other within one period to form the complete image. The background can be differentiated from the foreground in the signal of the image sensor by means of the periodically alternating pattern.

In an advantageous embodiment of the invention, a pattern detection, for example on the basis of a Fourier transform and/or Fourier filtering, can hereby be implemented in the signal of the image sensor. Consequently, the background can be differentiated from the foreground by means of the frequency with which the patterns are shown alternating. In a Fourier transform the background regions here show a component of the alternating frequency which the foreground does not show.

The patterns which the background shows can advantageously be periodic in a scanning direction of the image sensor and can in particular be for example a chessboard pattern. The individual regions of the pattern, i.e. for example the squares of the chessboard, can oscillate between light and dark just as between various colour components.

In order to produce the oscillating pattern, the background can be self-illuminating inter alia, for example an LED display, or an controllable filter corresponding to the pattern can also be disposed in front of the image of the background, which filter periodically blocks different parts of the image alternately.

In the case of a chessboard pattern, the oscillating pattern can show alternately in the chessboard pattern and the chessboard pattern inverse hereto.

Preferably, the pattern is binary, i.e. is switched precisely between two states. A given region of the pattern, in one state, lets through light of the image completely or illuminates with maximum brightness and, in the other state, tones down the light of the image or illuminates with reduced brightness. The toning down can also be complete toning down or complete darkness.

In a further embodiment of the invention, the coding of the image or of the background can comprise the image being represented in a grid in the form of coloured dots on a backdrop. The coloured dots together with the backdrop surrounding them thereby compose the colour of the image at the location of the coloured dot. It is thereby also possible that the backdrop of the image is black so that the colour of the image is given precisely by the colour of the coloured dots.

A colour filter is now disposed in front of the image sensor or in front of the camera, which colour filter precisely tones down the colours of the coloured dots or filters them out and possibly lets the colours of the background pass through without toning them down. Since in practice the background is not completely black, the colour filter, even in the case of a black background, lets through those colours which are not the colours of the coloured dots without toning them down.

In the image recorded by the image sensor, the colour of the backdrop of the image is present increased relative to the colours of the coloured dots as a result of the filter. If now, as in all colour-based embodiments of the invention, a colour is chosen for the backdrop which is not present in the foreground or only weakly, then the background can be differentiated from the foreground by means of colour-based keying. It is also possible to chose the colour filter such that all the colours of the scenery, with the exception of those of the coloured dots, can be composed from the colours let through by the colour filter.

In order to display the foreground in the finally produced image without colour deviation, the effect of the colour filter in front of the image sensor can be computed out.

In a particularly preferred embodiment, the colour filter in front of the image sensor can be a spectral filter, in particular an interference filter, which filters out specific ranges of the visible spectrum which are distributed over the entire visible range. In front of each of the coloured dots respectively, a spectral filter or interference filter which is complementary to the filter in front of the camera can then be disposed, which filter, for its part, lets through colours distributed uniformly over the visible spectrum so that, from these, all colours which are required for display of the image can be displayed. The fact that the colour filters of the coloured dots and of the camera are complementary, means here that, within the visible range, they let through different, essentially non-overlapping ranges of the visible spectrum. Instead of interference filters, also for example Notch filters can be used.

Because of the coloured dots, the background represents the image in a grid. The resolution of the grid is thereby chosen preferably such that an observer of the scenery recognises the image from a specific distance.

The coloured dots of the background can be configured to be reflecting or self-illuminating. Self-illuminating coloured dots can be produced for example by means of light bulbs or light diodes (LEDs). Since light diodes can be realized with very monochrome light, it is possible to compose the coloured dots of the background from light diodes and, by means of a filter in front of the image sensor or the camera, for example an interference filter, to filter out or tone down precisely the frequencies transmitted by the light diodes. If the frequencies not transmitted by the light diodes are let through by the filter in front of the camera without being toned down, then the backdrop of the image and also the foreground can be displayed from these colours.

In a further embodiment of the invention, the coding of the image can comprise the background radiating or reflecting only colours selected from at least one, preferably at least two, ranges of the visible spectrum at a spacing from each other in the spectrum. A colour filter through which the light emanating from the scenery runs before impinging on the image sensor is now disposed in front of the image sensor or the camera. Said colour filter is chosen such that it tones down those ranges of the visible spectrum from which the colours of the image are selected but lets through ranges of the visible spectrum situated between these ranges without being toned down. In this way, the background is present on the image sensor toned down or dark, whilst the foreground appears composed of those colours which are let through by the colour filter. If the filtered-out ranges or the ranges of the spectrum which are let through are chosen suitably, all colours of the foreground can consequently be displayed. In particular, also the choice of ranges which are let through can be adapted to those colours occurring in the foreground.

In the image recorded by the image sensor, the foreground is now differentiated from the background by means of keying onto the toned-down regions. The toning down in this case therefore produces the keying mask. If the toning down by the filter in front of the image sensor is not complete, then, provided it is necessary, the toned-down regions, in particular the foreground, can be reconstructed calculationally in order to display the final image.

Advantageously, the coding of the background can be achieved in this case by disposing a corresponding colour filter, i.e. for example an interference filter, in front of the background and behind the foreground, i.e. between the background and foreground. In this way, the light emanating from the background runs through this colour filter so that from the background essentially only that light which is filtered out by the filter between background and foreground impinges on the colour filter in front of the camera. Colour components which are not filtered out or toned down by the filter in front of the camera thereby emerge only from the foreground.

In a further possible embodiment of the invention, the coding of the background can comprise the background emitting electromagnetic radiation at least of one non-visible spectral range. A conversion device can now be disposed in front of the image sensor or in front of the camera. This can have a planar configuration, having a surface orientated essentially parallel to the image sensor and/or parallel to the light entrance surface of the camera.

The conversion device now has regions, on the one hand, at which the visible light can pass through the device without impedance. In other regions, the device has elements which effect a conversion of the non-visible radiation into visible light and include the converted light in the beam path of the light emanating from the background. The inclusion in the beam path can take place for example by means of one or more suitable lenses which include the light-converting element in the beam path of the camera lens system such that it appears for the camera as part of the background. Advantageously, a separate lens of this type is assigned to each light-converting element.

Preferably, the converting elements are disposed on the surface of the conversion device in a grid. They are present therefore on this surface at equidistant spacings. The visible light can pass through the device between the conversion elements.

The non-visible electromagnetic radiation can be UV radiation or infrared radiation.

In the image recorded by the image sensor, the conversion device produces a mask, by means of which the background is differentiated via a keying process from the foreground which does not emit, or only to a lesser extent, the corresponding non-visible radiation. Advantageously, the conversion device converts the non-visible light into a colour which does not occur in the foreground or only to a lesser extent.

There are possible as light-converting elements dots of fluorescent or phosphorescent material. In turn, preferably a device for integration of the corresponding dot into the background in the beam path of the camera is provided for each of the dots. The conversion of the light by the fluorescent or phosphorescent materials produces here a non-directed, visible light of a specific colour. Therefore, lenses which are subsequently positioned and integrated in the filter are preferably used in order to bundle this scattered light corresponding to the optical path. As assistance, also barriers can be used here in the filter which correspondingly complement the function of the lenses. The barriers can thereby absorb or reflect the part of the scattered light which cannot be bundled in the beam path of the camera as a result of its direction through the lenses because it extends for example transversely relative to the beam path. For scattered light counter to the beam path, the barrier can be semi-reflective (i.e. the incident non-visible electromagnetic radiation is let through, the scattered light converted by the materials is, in contrast, reflected in the reverse direction and hence again cast back into the beam path).

In a further possible embodiment of the present invention, the coding of the image can comprise the background or the image radiating and/or reflecting polarised light only of one specific polarisation direction or polarisation direction of rotation. Linear polarisation or circular polarisation can be used here. A colour filter and a polarisation filter are now disposed in front of the camera or the image sensor through which filter the light emanating from the scenery runs before it impinges on the image sensor. Preferably, the colour filter is thereby disposed in front of the polarisation filter so that light emanating from the scenery therefore runs firstly through the colour filter and then the polarisation filter before it impinges on the image sensor. The colour filter can preferably tone down or increase or amplify one colour component.

The polarisation filter in front of the image sensor is thereby orientated now such that it filters out light of that polarisation which is radiated or reflected by the image. As a result, differentiation of the background from the foreground can be effected by means of keying onto the dark image components in the image produced by the image sensor. The dark image components which have no colour tone of the colour filter serve therefore as mask for the keying.

Reference may be made to the fact that the colour filter here preferably only tones down the corresponding colour component but does not filter it out completely. In this way, those black regions, which are produced as a result of the fact that the polarisation filter filters out polarised light of the background, can be differentiated from possible black regions of the foreground as a result of the fact that the latter have a lighter black which has the colour tone of the colour filter. The recorded black in natural scenes is not completely dark but rather dark grey. Also the objects hence obtain a non-perceptible but measurable colour tone, due to the colour filter. The light reduced by the polarisation filter is however most extensively absorbed independently of the colour.

In a further possible embodiment of the present invention, the coding of the image or of the background comprises the background emitting electromagnetic radiation at least of one non-visible spectral range, such as UV or infrared. A conversion device through which light emanating from the scenery runs before it impinges on the image sensor is now disposed in front of the image sensor. This conversion device converts the non-visible electromagnetic radiation which emanates from the scenery into visible light and blends this into the scenery from the perspective of the image sensor.

Advantageously, the conversion device has a beam splitter through which the light runs before impinging on the image sensor and which deflects the non-visible radiation at least in part towards a converter which detects the non-visible radiation and produces a corresponding pattern of visible light which corresponds precisely to the background. This visible light can be blended into the beam path towards the image sensor for example via a semi-permeable mirror so that the image sensor sees the scenery through the semi-permeable mirror and the beam splitter.

Thus, in this embodiment, firstly the non-visible radiation is deflected via the beam splitter at least in part out of the beam path and an image corresponding to the background is blended in via the semi-permeable mirror.

The converter can have an image sensor and an imaging lens system via which an image of the background is produced on the image sensor from the non-visible radiation. The conversion device can produce the corresponding visible radiation then for example by means of an image display, the image of which is blended into the beam path of the camera, as described. The blended-in image of the display forms an additional colour tone or a pattern in the region of the background in the image produced by the image sensor of the camera. The subsequent keying produces a mask herefrom, by means of which the background can be differentiated from the foreground.

In all the embodiments, an element being disposed in front of the camera or in front of the image sensor means that it is disposed between the image sensor and the foreground of the scenery. It can thereby be accommodated in front of the camera lens system, in the camera lens system or between the camera lens system and the image sensor. The fact that a filter may be disposed in front of the background means that it is disposed, on the one hand, between the image or the background and, on the other hand, the foreground.

In all embodiments of the invention where periodically alternating components of the background or of an image of the background are shown, the alternating frequency is preferably greater than the maximum perceptible alternating frequency of 25 Hz, above which the shown alternating components are perceived by an observer as an image composed of the components. The alternating frequency is preferably greater than or equal to 50 Hz.

The invention is intended to be explained subsequently by way of example with reference to some figures. The same reference numbers thereby correspond to the same or corresponding features. The features shown in the examples can also be combined in the various examples and be produced independently of the concrete example.

Figure 2:
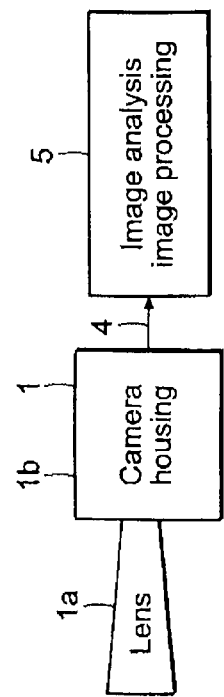
Figure 2:
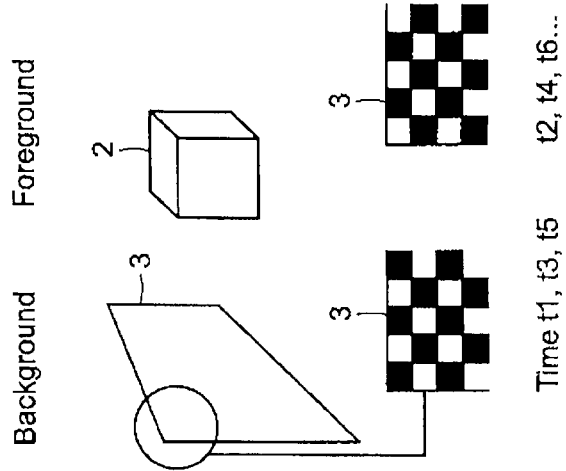
Figure 3:
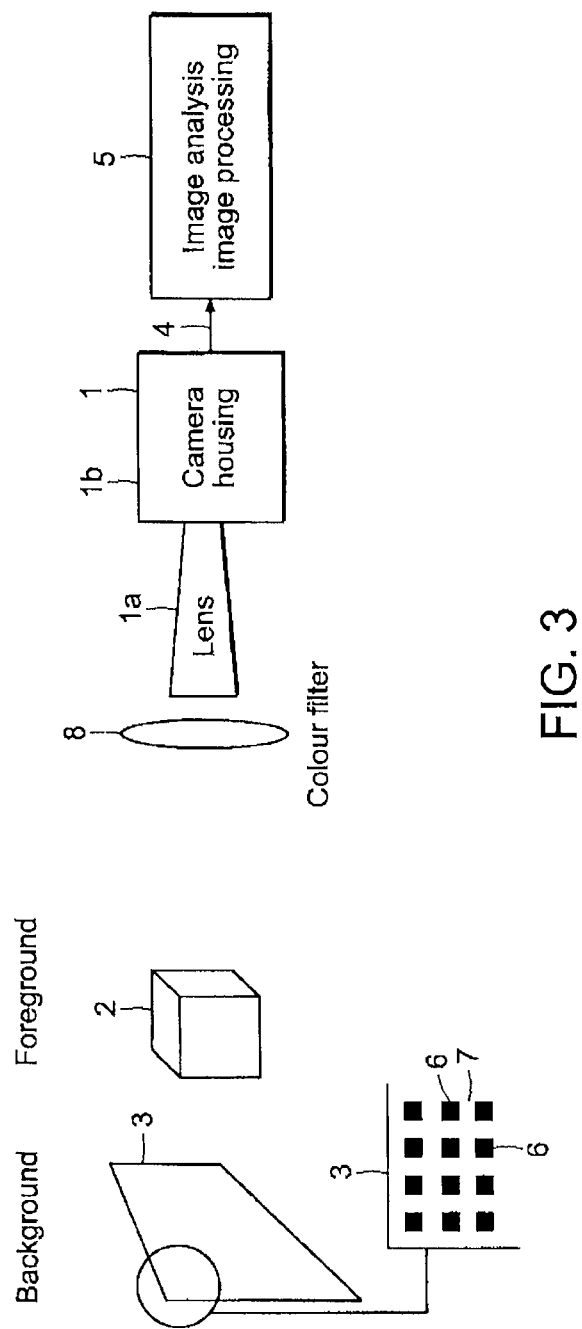
Figure 4:
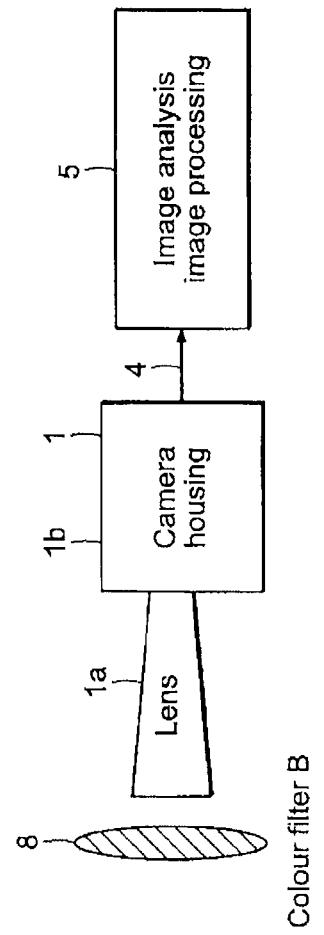
Figure 4:
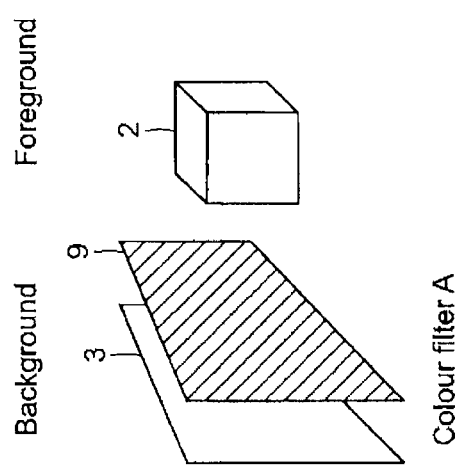
Figure 5:
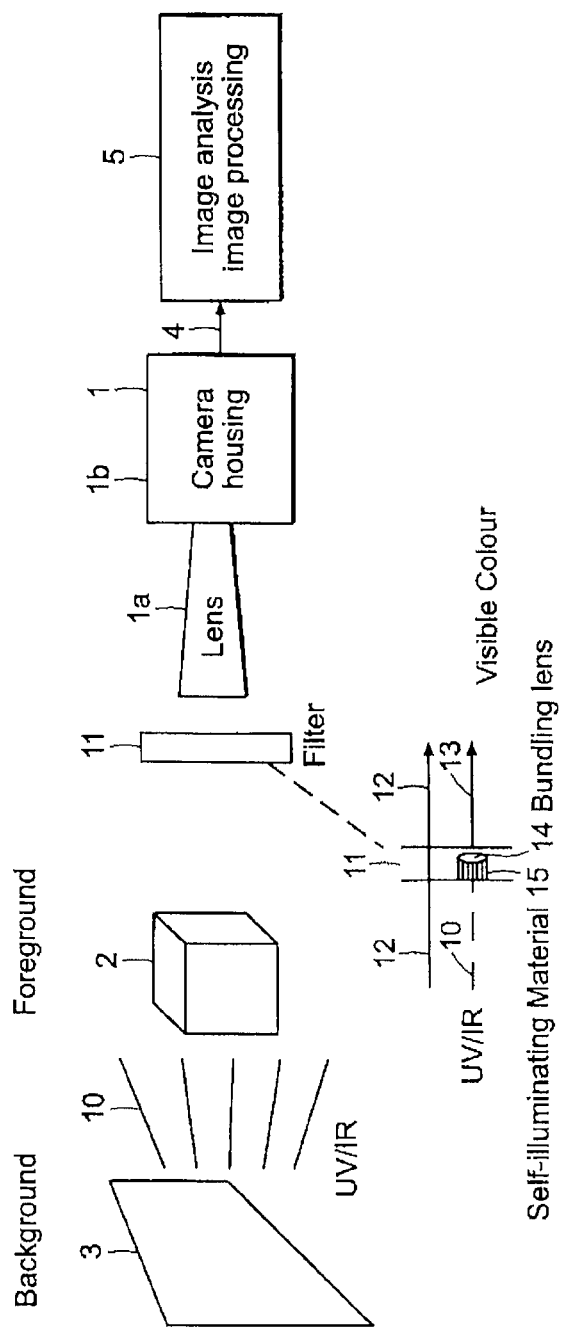
Figure 6:
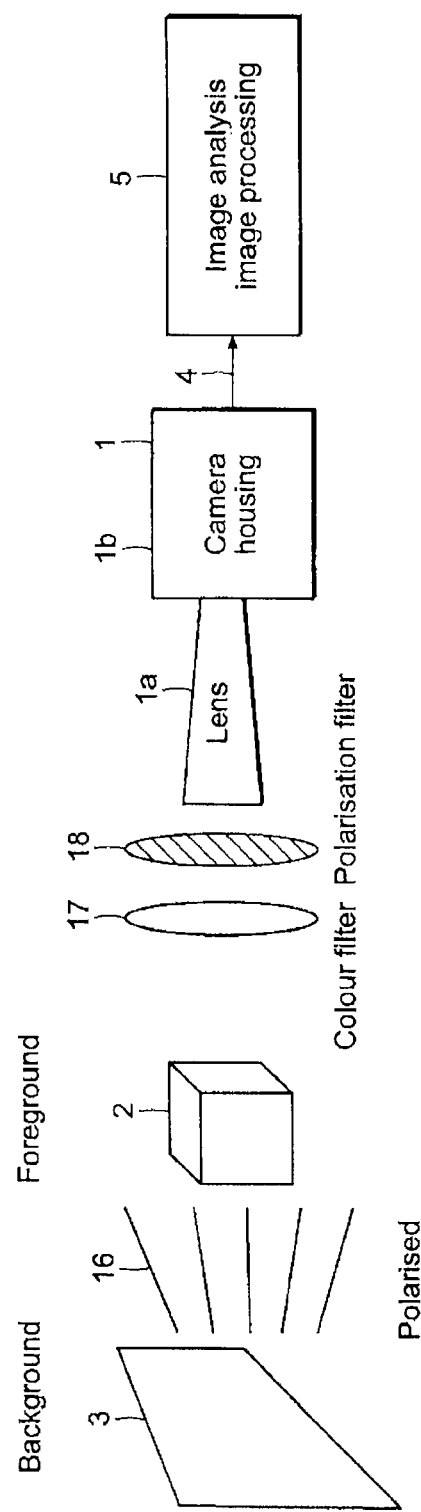
Figure 7:
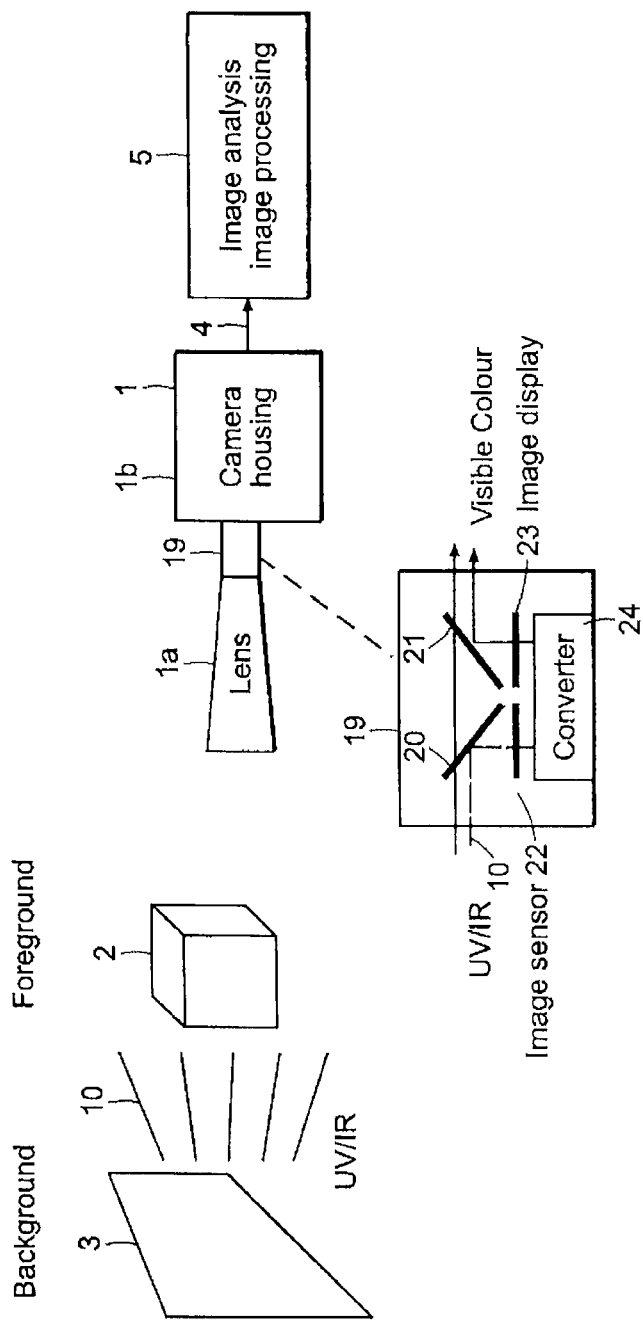
Figure 8:
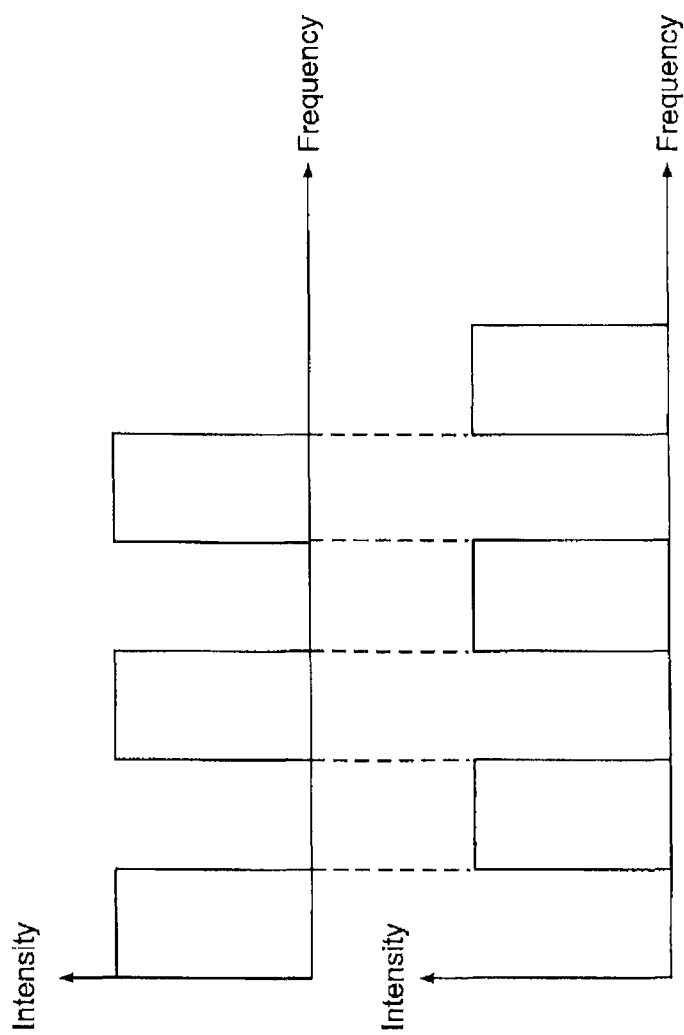

There are shown:

FIG. 1 a construction for implementing the method according to the invention according to a first embodiment of the present invention;

FIG. 2 a construction for implementing the method according to the invention according to a second embodiment of the present invention;

FIG. 3 a construction for implementing the method according to the invention according to a third embodiment of the present invention;

FIG. 4 a construction for implementing the method according to the invention according to a fourth embodiment of the present invention;

FIG. 5 a construction for implementing the method according to the invention according to a fifth embodiment of the present invention;

FIG. 6 a construction for implementing the method according to the invention according to a sixth embodiment of the present invention;

FIG. 7 a construction for implementing the method according to the invention according to a seventh embodiment of the present invention; and FIG. 8 two spectra of two mutually complementary interference filters as schematic representation.

FIG. 1 shows a device for implementing the method according to the invention according to a first embodiment of the invention. Scenery with a foreground 2 and a background 3 is filmed by means of a camera 1. The camera 1 has an image sensor, not shown, which produces an image signal 4 which is supplied to a device for image analysis and/or image processing 5. The camera 1 can have for example an imaging lens system 1a and a camera housing 1b in which the image sensor is disposed.

The foreground 2 is a simple cube in the illustrated example. In all embodiments, the method according to the invention can however be implemented with any foregrounds 2, in particular for example with sportspersons of a sporting event. The background 3 can likewise be of any kind as long as it allows a coding as is required for implementing the invention. For example, the background can be a studio background or pitch-perimeter advertising in a stadium.

In the example shown in FIG. 1, the background 3 shows an image. Periodically alternating different components of respectively one period of the image are thereby represented, the components composing the complete image. The display of the components of the image at times $t_1, t_2, t_3 \ldots$, $t_8, \ldots$ is now synchronised with the exposure of the camera such that the camera records, in at least one period, preferably in each period, only a specific one of the components $t_1, t_3, t_5, \ldots$ which is chosen such that it allows a differentiation between foreground and background in the image signal by means of keying. The keying can be for example colour-based keying, preferably chroma-keying. The analysis device 5 then differentiates the background from the foreground in the images 4 recorded by the image sensor of the camera 1.

In the illustrated example, the image of the background can be divided for example into two images, the first image comprising an optionally reduced colour component from the original image of the background and the second image the complementary colours so that the original image is produced in the combination of both images. Both images can then be shown alternating in such a high frequency that they are no longer individually perceptible to an observer (e.g. 100 Hz). The recording camera 1 can then operate synchronously with half the frequency (e.g. 50 Hz) and with a reduced exposure time (e.g. 1/100 sec.) so that only the first of the two images with the chosen colour component is recorded by it. The method can be produced here also passively with a reflecting background. For this purpose, an actuatable LCD colour filter can be disposed in front of the background, which filter lets through respectively the corresponding component of the image. In the active case in which the background is self-illuminating (for example as LCD display), the background can be actuated specifically in order to show correspondingly the components of the image.

FIG. 2 shows a further advantageous setup for implementing the method according to the invention. The background for the coding hereby shows periodically alternating patterns which complement each other within one period to form the complete image. If all the patterns of one period are therefore regarded together, then the complete image is produced.

The scenery comprising background 3 and foreground 2 is recorded by the image sensor of the camera 1 and the image signal 4 is analysed by means of an analysing device 5. In the image recorded by the image sensor, the background 3 can now be differentiated from the foreground 2 by means of the periodically alternating pattern. For this purpose, a Fourier transform can be implemented for example in the signal 4 of the image sensor and the background 3 can be differentiated from the foreground 2 by means of the frequency of the alternating display of the patterns. The image sensor can hereby be scanned for example in lines and the analysis can be implemented directly in the scan signal. The periodically alternating pattern produces a frequency component in the Fourier transform with the alternating frequency wherever the background is imaged.

The analysis can be effected both over time by means of analysis of successive images and within one image. Hence, the corresponding pattern in the image analysis of the camera 1 can be sought. The analysis can be assisted by information from a camera tracking. For example, information from the camera tracking can help in the determination of the pattern size.

Different patterns are possible. In the illustrated case, the background 3 shows a chessboard pattern with alternating black squares and squares which show the cut-out from the image at the location of the corresponding square. The chessboard pattern and the chessboard pattern complementary hereto, in the case of which the black squares and squares showing the image are exchanged relative to the actual chessboard pattern, is shown here alternating.

The frequency of the oscillation is chosen so high here that it cannot be perceived by the observer (e.g. 50 Hz). The frequency can also be coupled to the image frequency of the camera.

The pattern of the background can be produced passively, for example by an actuatable filter, such as an LCD filter. It can also be configured actively as a self-illuminating background, for example as LED display.

FIG. 3 shows a further possible arrangement for implementing the method according to the invention. For the coding, here the image is represented by means of coloured dots 6 on a backdrop 7. The coloured dots 6 on the backdrop 7 are preferably arranged in a grid. The coloured dots 6, respectively together with the backdrop surrounding them, represent the colour of the image at the corresponding location. The backdrop can also be black so that the complete contribution to the colour of the image by the coloured dots is provided. A colour filter 8 is now disposed in front of the image sensor of the camera 1, preferably in front of the lens 1a of the camera 1, which coloured filter tones down or filters out precisely the colours radiated from the coloured dots. Preferably, the colour of the backdrop 7 of the background 3 is chosen such that it does not occur or only to a small extent in the foreground 2. In the image signal 4 produced by the image sensor of the camera 1, the foreground 2 can then be differentiated from the background 3, in the analysing device 5, by means of keying onto the colour tone of the backdrop 7. The backdrop 7 forms here therefore the colour to be analysed (or a pattern) for production of a mask for the keying.

Preferably, the dots are disposed such that the grid does not appear to be grid-shaped for a direct observer at a specific minimum distance. This minimum distance can be provided for example by the normal location of observers in the scenery itself, in the case of pitch-perimeter advertising in a stadium for example by the distance of the nearest seats from the pitch-perimeter advertising. If then the coloured dots 6 are disposed in a grid on a specially coloured or black backdrop 7 at a small spacing relative to each other, the actual image is visible for the observer. Furthermore, the grid should also be chosen to be so narrow that the grid cannot be detected by the camera from the position thereof at a specific minimum distance. Both for the camera and for an observer in the scenery, the desired coloured impression is then produced from a corresponding distance relative to the background.

The coloured dots now radiate only specific wavelengths from the visible range of light which are filtered out precisely by the colour filter 8 in front of the image sensor so that only the colour of the backdrop essentially remains left on the image sensor.

The solution with interference filters, which is shown in FIG. 3 and dealt with later in more detail with reference to FIG. 8, can be achieved particularly favourably. An interference filter which lets through only a part of the frequencies of the visible spectrum is hereby disposed in front of each coloured dot 6. The part thereby preferably has a plurality of regions at a spacing from each other which are distributed over the visible spectrum such that the colours of the image can be composed therefrom. The colour filter 8 is then an interference filter which is complementary to the colour filters in front of the coloured dots 6, which interference filter filters out or tones down precisely those colours which are let through by the colour filters in front of the coloured dots 6 without being toned down. The coloured dots 6 are preferably self-illuminating, i.e. for example light bulbs or LEDs.

FIG. 4 shows a further possible embodiment for implementing the method according to the invention. There is disposed hereby, between the background 3 and the foreground 2, a colour filter 9 which radiates only colours selected from at least one, preferably two, ranges of visible light which are at a spacing from each other in the spectrum. In front of the image sensor or the lens system 1a of the camera 1, there is then disposed a further colour filter 8 through which light emanating from the scenery runs en route to the image sensor. This colour filter 8 filters out or tones down precisely those ranges of the spectrum which are let through by the colour filter 9. As a result, on the image sensor the background appears toned down or black relative to the foreground 2 which radiates in particular light of those frequency ranges which are let through by the colour filter 8. The dark regions therefore form a mask in the image signal 4 of the image sensor, with which mask keying onto the dark regions and hence to the background can be implemented. In this way, the image analysing device 5 can differentiate the background 3 from the foreground 2.

In this embodiment, the filters 8 and 9 are also preferably interference filters which are complementary to each other, i.e. are permeable for different, preferably non-overlapping ranges of the visible spectrum.

The colour filter 9 can also be dispensed with if the background 3 radiates per se only light of specific frequency ranges which are filtered out by the filter 8. Such a self-illuminating background can be produced for example with LEDs which radiate a defined spectrum. The colour filter 8 is then designed such that it tones down or filters out precisely the frequencies radiated by the LEDs.

The filter 9 can be chosen such that the colour regions of the visible spectrum which are let through by it suffice to display the colours occurring in the background. Correspondingly, the colour filter 8 can also be chosen such that the frequencies let through by it suffice to display the colours occurring in the foreground 2. In this way, the image produced by the image sensor can be used further without correction. However, a correction of the colours of the foreground is always possible in the image recorded by the image sensor which corrects possible colour deviations because of the filter 8.

FIG. 5 shows a further construction for implementing the method according to the invention. For the coding, the background radiates non-visible radiation 10 which can for example be ultraviolet radiation or infrared radiation. A planar conversion device 11 is now disposed in front of the image sensor or in front of the lens 1a of the camera 1, which conversion device lets through radiation impinging on it in regions and has elements 15 in regions which are for example fluorescent or phosphorescent, by means of which the non-visible radiation 10 is converted into visible light 13. The elements 15 can thereby be disposed uniformly and in particular in a grid over a surface of the device 11 so that visible light 12 can pass through in every region, on the one hand, and, on the other hand, the non-visible radiation 10 can be converted into visible light. All radiation impinging on the image sensor runs through the device 11. On the image sensor, the light passing unchanged through the device is therefore represented, on the one hand, and, on the other hand, the light 13 produced by the conversion of the non-visible radiation 10. Since the non-visible radiation 10 emanates from the background 3, the image sensor of the camera 1 records the light 13 precisely where the background 3 is imaged. Preferably, the colour of the light 13 produced by the device 11 is chosen such that it can be differentiated from the colours occurring in the foreground 2. The produced light 13 then forms a mask, by means of which the background 3 can be differentiated from the foreground 2 by a keying process.

Provided that the elements 15 for the conversion of non-visible radiation into visible light 13 radiate undirected light 13, a lens 14 can be assigned to each of the elements 15, which lens is disposed such that it represents the unconverted light 13 from the perspective of the image sensor in the background 3. Preferably, screening can also be provided for each element, which screening lets light pass through only in the direction of the optical beam path.

FIG. 6 shows a further possible, arrangement for implementing the method according to the invention. The background 3 hereby radiates polarised light 16 of a specific polarisation direction. A colour filter 17 and also a polarisation filter 18 is now disposed in front of the image sensor of the camera 1, the passage direction of which is perpendicular to the polarisation direction of the light 16 radiated from the background. When using circular polarisation, the passage direction of rotation would be complementary to the polarisation rotation. Preferably, light emanating from the scenery firstly runs though the colour filter 17 and then the polarisation filter 18 before it impinges on the image sensor. In the image recorded by the image sensor, the background appears dark, without colour tone, in this arrangement. For direct observers of the scenery, the background 3, in contrast, appears in its normal colours since these observers can perceive the polarised light 16. A colour tone, which the foreground 2 has in the image produced by the image sensor of the camera 1 because of the colour filter 17, can subsequently be compensated for in the image signal 4 by the computer.

In this embodiment of the method, the dark image components without colour tone, i.e. those image components resulting from the background 3, form a mask, by means of which keying can be implemented in order to differentiate the background 3 from the foreground 2.

FIG. 7 shows a further arrangement for implementing the method according to the invention. The background 3 hereby radiates non-visible radiation 10, for example ultra-violet radiation, or infrared radiation in addition to the actual image. In front of the image sensor, preferably in the direction of the beam path behind the imaging lens system 1a of the camera 1, a conversion device 19 is disposed in this embodiment, by means of which a visible image of the background 3 can be produced from the non-visible light. The device 19 thereby has a beam splitter 20 and a semipermeable mirror 21 which are disposed in succession in the beam path of the light impinging on the image sensor from the scenery. The beam splitter 20 deflects the non-visible light at least partially onto an image sensor 22 of the conversion device 19. A converter 24 records the image produced by the image sensor 22 from the non-visible radiation 10 and produces, on an image display 23, an image of visible light which corresponds to the image recorded by the image sensor and therefore shows precisely the pattern which is preset by the non-visible radiation 10. The image produced by the image display is then blended into the beam path of the light impinging on the image sensor of the camera 1 from the scenery by means of the semipermeable mirror 21 and serves in the image signal produced by the image sensor of the camera 1 as pattern for the production of a keying mask, by means of which the foreground 2 can be differentiated from the background 3 by keying.

FIG. 8 shows, in the upper and lower part, spectra of two mutually complementary interference filters in a schematic representation. The frequency of the light is plotted on the horizontal axis and is intended to span essentially the visible range in the illustrated example. The respective intensity which light which has passed through the corresponding interference filter has is plotted on the vertical axis if the interference filter is radiated with white light which comprises all frequencies of the illustrated range with the same intensity. It can be detected that the interference filters let a plurality of ranges of visible light at a spacing in the spectrum pass through. The regions of the passing light can thereby be chosen in both interference filters such that all required colours of the background 3 or of the foreground 2 can be composed from them. Both illustrated interference filters are mutually complementary which means that those regions of the spectrum which are let through by the interference filter shown in the upper part are filtered out precisely by the interference filter shown in the lower part, whilst those frequencies which are filtered out by the upper interference filter are let through precisely by the lower interference filter. Reference may be made to the fact that the filters need not completely filter out the corresponding colour components in order to make the method according to the invention possible. Toning down is also adequate. Furthermore, it is also not required that the frequency ranges are separated from each other so clearly, as is represented schematically in FIG. 8. A certain degree of overlapping of the ranges let through by the different filters is permissible.

The invention claimed is:

1. A method for differentiating between background and foreground of a scenery in images recorded by an electronic camera, the background showing an arbitrary image coded with a coding such that the arbitrary image is visible for a direct observer of the background, and the background being differentiated from the foreground in a signal produced by an image sensor, recording the images, of the electronic camera by means of the coding,
wherein the coding comprises the background displaying the arbitrary image only with colours selected from one or at least two, ranges of a visible spectrum at a spacing from each other, and a light emanating from the background running through a colour filter before impinging on the image sensor, which the colour filter filters out or tones down these ranges of the visible spectrum, and letting other ranges of the visible spectrum pass through without being toned down,
wherein the coding further comprises the arbitrary image being represented in a grid of coloured dots on a backdrop, the coloured dots respectively together with the backdrop surrounding them composing the colours of the arbitrary image, and the colour filter being disposed in front of the image sensor, which the colour filter tones down colours of the coloured dots and lets through colours of the backdrop without being toned down, the background being differentiated from the foreground by means of keying, on the colours of the backdrop,
wherein the colours of the coloured dots and the colours of the backdrop form disjoint parts of the visible spectrum, a light of the coloured dots running through at least one spectral filter, which a light emitted from the backdrop does not run through, and in that the colour filter disposed in front of the image sensor being a spectral filter or an interference filter, which is complementary to filters in front of the coloured dots.

2. A method for differentiating between background and foreground of a scenery in images recorded by an electronic camera, the background showing an arbitrary image coded with a coding such that the arbitrary image is visible for a direct observer of the background, and the background being differentiated from the foreground in a signal produced by an image sensor, recording the images, of the electronic camera by means of the coding characterised in that the coding comprises the arbitrary image being represented in a grid of coloured dots on a backdrop, the coloured dots respectively together with the backdrop surrounding them composing colours of the arbitrary image, and
a colour filter being disposed in front of the image sensor, which the colour filter tones down colours of the coloured dots and lets through colours of the backdrop without being toned down, the background being differentiated from the foreground by means of keying, on the colours of the backdrop,
wherein the colours of the coloured dots and the colours of the backdrop form disjoint parts of a visible spectrum, a light of the coloured dots running through at least one spectral filter, which a light emitted from the backdrop does not run through, and in that the colour filter disposed in front of the image sensor being a spectral filter or an interference filter, which is complementary to filters in front of the coloured dots.

3. A method according to claim 2, wherein the coloured dots are self-illuminating or light diodes.

4. A method according to claim 2, wherein the coding further comprises the background radiating only colours selected from one or at least two, ranges of the visible spectrum at a spacing from each other, a light emanating from the scenery running through the colour filter before impinging on the image sensor, which the colour filter tones down those ranges of the visible spectrum from which the colours of the arbitrary image are selected, and letting through ranges of the visible spectrum situated between these ranges without being toned down, the background being differentiated from the foreground by keying onto the ranges of the visible spectrum toned down by the colour filter in front of the image sensor.

5. A method for differentiating between background and foreground of a scenery in images recorded by an electronic camera, the background showing an arbitrary image coded with a coding such that the arbitrary image is visible for a direct observer of the background, and the background being differentiated from the foreground in a signal produced by an image sensor, recording the images, of the electronic camera by means of the coding, wherein the coding comprises the background radiating only colours selected from at least one or at least two, ranges of a visible spectrum at a spacing from each other in a spectrum, a light emanating from the scenery running through a colour filter before impinging on the image sensor, which the colour filter tones down those ranges of the visible spectrum from which colours of the arbitrary image are selected, and letting through ranges of the visible spectrum situated between these ranges without being toned down, the background being differentiated from the foreground by keying onto the ranges of the visible spectrum toned down by the colour filter in front of the image sensor,
- wherein the coding further comprises the arbitrary image being represented in a grid of coloured dots on a backdrop, the coloured dots respectively together with the backdrop surrounding them composing the colours of the arbitrary image, and the colour filter being disposed in front of the image sensor, which the colour filter tones down colours of the coloured dots and lets through colours of the backdrop without being toned down, the background being differentiated from the foreground by means of keying, on the colours of the backdrop,
- wherein the colours of the coloured dots and the colours of the backdrop form disjoint parts of the visible spectrum, a light of the coloured dots running through at least one spectral filter, which a light emitted from the backdrop does not run through, and in that the colour filter disposed in front of the image sensor being a spectral filter or an interference filter, which is complementary to filters in front of the coloured dots.

* * * * *